(No Model.)
J. H. & W. J. CONNELL.
GRUBBING IMPLEMENT.
No. 594,461. Patented Nov. 30, 1897.
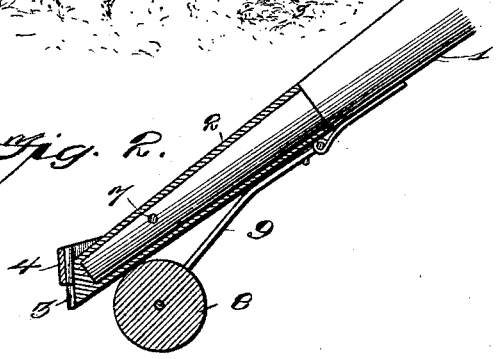
WITNESSES
INVENTORS
John H. Connell,
William J. Connell,
By John Shepherson
Attorney

UNITED STATES PATENT OFFICE.

JOHN H. CONNELL AND WILLIAM J. CONNELL, OF CHARLESTON, WEST VIRGINIA.

GRUBBING IMPLEMENT.

SPECIFICATION forming part of Letters Patent No. 594,461, dated November 30, 1897.

Application filed January 29, 1897. Serial No. 621,188. (No model.)

*To all whom it may concern:*

Be it known that we, JOHN H. CONNELL and WILLIAM J. CONNELL, citizens of the United States, residing at Charleston, in the county of Kanawha and State of West Virginia, have invented certain new and useful Improvements in Grubbing Implements; and we do hereby declare the following to be a full, clear, and exact description of the invention, such as will enable others skilled in the art to which it appertains to make and use the same.

This invention has reference to a novel construction in a grubbing implement; and it consists in the features of construction hereinafter fully described and specifically claimed.

In the accompanying drawings, forming a part of this specification, Figure 1 is a perspective view of the grubbing implement, showing the manner in which the same is used. Fig. 2 is a vertical longitudinal section.

Referring now to said drawings, 1 indicates the handle, which is preferably provided at its lower end with a ferrule 2, that extends some distance along the handle. The end of the ferrule is roughened, as shown at 3. Pivoted to the side of the ferrule is a clamping-jaw 4, consisting of a straight side piece having an angular end, which latter fits against the end of the ferrule. The inner face of this angular end is roughened or toothed to coact with the roughened end of the ferrule, whereby a firm and substantial grip can be obtained upon the plant to be pulled. The free end of the clamping-jaw is provided with a handle 5, by means of which it can be swung upon a pivot. The other end of the jaw is provided with a plurality of openings 6, which receive the pivot 7, whereby the distance between the end of the clamping-jaw and the end of the ferrule can be regulated to adjust the implement for use in connection with plants of different sizes. The lower-sided instrument is provided with a roller 8, carried by a frame 9, that is pivoted to the wooden part of the handle and which extends forward and holds the roller 8 near the lower end of the ferrule.

In use it is seen that the implement rests upon the roller, and by opening the clamping-jaws to allow the plant to be placed between it and the end of the ferrule the plant can be engaged, and then by turning the handle upon the roller as a fulcrum the plant can be pulled from the ground, it being noted that the roller turns so that it moves toward the plant and in this way shifts the fulcrum and allows the implement to give a straight pull upon the plant.

Having thus described the invention, what is claimed as new, and desired to be secured by Letters Patent, is—

1. An implement of the kind specified consisting of a handle, a clamping-jaw pivoted to the lower end portion of said handle and adapted to swing vertically and having an angular end extending across the end of said handle, and a roller carried below said handle.

2. In an implement of the kind specified, a handle having a roller, said handle having a roughened end, and a clamping-jaw having a roughened inner face to coact with the roughened end of said handle.

3. In an implement of the kind specified, a handle, a roller carried thereby, a pivoted clamping-jaw having an angular end portion extending across the end of said handle and provided with a handle 5.

In testimony whereof we have signed this specification in the presence of two subscribing witnesses.

JOHN H. CONNELL.
WILLIAM J. CONNELL.

Witnesses:
E. T. CRAWFORD,
D. W. CRAWFORD.